(12) United States Patent
Tomioka et al.

(10) Patent No.: US 11,084,187 B2
(45) Date of Patent: Aug. 10, 2021

(54) FIBER-REINFORCED COMPOSITE MATERIAL MOLDED ARTICLE AND METHOD FOR MANUFACTURING SAME

(71) Applicant: Mitsubishi Chemical Corporation, Chiyoda-ku (JP)

(72) Inventors: Masao Tomioka, Tokyo (JP); Takeshi Ishikawa, Tokyo (JP); Akinobu Sasaki, Tokyo (JP)

(73) Assignee: Mitsubishi Chemical Corporation, Chiyoda-ku (JP)

( * ) Notice: Subject to any disclaimer, the term of this patent is extended or adjusted under 35 U.S.C. 154(b) by 551 days.

(21) Appl. No.: 15/565,730

(22) PCT Filed: Apr. 15, 2016

(86) PCT No.: PCT/JP2016/062120
§ 371 (c)(1),
(2) Date: Oct. 11, 2017

(87) PCT Pub. No.: WO2016/167349
PCT Pub. Date: Oct. 20, 2016

(65) Prior Publication Data
US 2018/0071957 A1    Mar. 15, 2018

(30) Foreign Application Priority Data
Apr. 17, 2015   (JP) .............................. JP2015-084918

(51) Int. Cl.
*B32B 5/02* (2006.01)
*B32B 5/26* (2006.01)
(Continued)

(52) U.S. Cl.
CPC .......... *B29B 15/08* (2013.01); *B29C 37/0078* (2013.01); *B29C 43/20* (2013.01);
(Continued)

(58) Field of Classification Search
CPC .......... B32B 5/28; B32B 5/26; B32B 2260/04; B32B 2260/021; B32B 2262/10;
(Continued)

(56) References Cited

U.S. PATENT DOCUMENTS 4,269,884 A  *  5/1981  DellaVecchia ........ B29C 59/046
                                                                428/131
6,372,078 B1    4/2002  Melchert et al.
(Continued)

FOREIGN PATENT DOCUMENTS

EP    3 002 355 A1    4/2016
JP    49-030458 A    3/1974
(Continued)

OTHER PUBLICATIONS

Extended European Search Report dated Mar. 23, 2018 in Patent Application No. 16780140.6, 5 pages.
(Continued)

*Primary Examiner* — Joanna Pleszczynska
(74) *Attorney, Agent, or Firm* — Oblon, McClelland, Maier & Neustadt, L.L.P.

(57) ABSTRACT

The purpose of the present invention is to obtain a fiber-reinforced composite material molded article having high adhesive strength in a boundary portion between an insert portion comprising a fiber-reinforced resin substrate and an integrally molded portion molded integrally with the insert portion. A fiber-reinforced composite material molded article (1) containing reinforcing fibers and a thermoplastic resin and being provided with a first layer (23), a second layer (22), and a third layer (21) in this order, the thickness of each layer, the ratio of the total volume of reinforcing fibers (x2) having a fiber length of 3 mm to less than 100 mm with respect to the total volume of reinforcing fibers present in the layer, the ratio of the total volume of reinforcing fibers
(Continued)

(y2) having a fiber length of 0.02 mm to less than 3 mm with respect to the total volume of reinforcing fibers present in the layer, and the volume content of fibers in each layer being controlled so as to be in specific ranges.

13 Claims, 3 Drawing Sheets

(51) Int. Cl.
    *B32B 5/28*       (2006.01)
    *B32B 9/00*       (2006.01)
    *B32B 27/04*     (2006.01)
    *B29C 43/20*     (2006.01)
    *B29C 45/14*     (2006.01)
    *B29C 70/08*     (2006.01)
    *C08J 5/04*      (2006.01)
    *B29B 15/08*     (2006.01)
    *B29C 70/48*     (2006.01)
    *B29C 37/00*     (2006.01)
    *B29C 65/52*     (2006.01)
    *B29C 70/34*     (2006.01)
    *B29C 45/56*     (2006.01)
    *B29C 65/02*     (2006.01)
(52) U.S. Cl.
    CPC ........ *B29C 45/14* (2013.01); *B29C 45/14631* (2013.01); *B29C 65/52* (2013.01); *B29C 70/081* (2013.01); *B29C 70/34* (2013.01); *B29C 70/48* (2013.01); *B29C 45/561* (2013.01); *B29C 65/02* (2013.01); *C08J 5/042* (2013.01); *C08J 2323/12* (2013.01)
(58) Field of Classification Search
    CPC . B32B 5/02; B32B 2262/106; B32B 2255/02; B32B 2260/023; B32B 9/007; B32B 27/04; B29C 43/20; B29C 45/14; B29C 70/081; C08J 5/042
    See application file for complete search history.

(56) References Cited

U.S. PATENT DOCUMENTS

| | | | |
|---|---|---|---|
| 2004/0067705 A1 | 4/2004 | Ton-That et al. | |
| 2005/0176327 A1 | 8/2005 | Wenstrup et al. | |
| 2005/0250406 A1 | 11/2005 | Wenstrup et al. | |
| 2005/0260915 A1 | 11/2005 | Wenstrup et al. | |
| 2007/0269645 A1* | 11/2007 | Raghavendran | B32B 5/28 |
| | | | 428/292.1 |
| 2014/0124976 A1 | 5/2014 | Tateyama et al. | |
| 2015/0376353 A1 | 12/2015 | Takebe et al. | |
| 2016/0089853 A1 | 3/2016 | Meure et al. | |

FOREIGN PATENT DOCUMENTS

| | | |
|---|---|---|
| JP | 51-001266 B1 | 1/1976 |
| JP | 04-079911 A | 3/1992 |
| JP | 11-090986 A | 4/1999 |
| JP | 2011-79289 A | 4/2011 |
| JP | 2012-071595 A | 4/2012 |
| JP | 2014-213539 A | 11/2014 |
| JP | 2014-213540 A | 11/2014 |
| WO | WO 2007/022228 A1 | 2/2007 |
| WO | 2012/172982 A1 | 12/2012 |
| WO | 2014/103658 A1 | 7/2014 |

OTHER PUBLICATIONS

International Search Report dated Jul. 5, 2016, in PCT/JP2016/062120 filed Apr. 15, 2016.

* cited by examiner

FIBER-REINFORCED COMPOSITE MATERIAL MOLDED ARTICLE AND METHOD FOR MANUFACTURING SAME

TECHNICAL FIELD

The present invention relates to a molded article of fiber-reinforced composite material and to a method for manufacturing such a molded article.

The present application is based upon and claims the benefit of priority to Japanese Application No. 2015-084918, filed Apr. 17, 2015, the entire contents of which are incorporated herein by reference.

BACKGROUND ART

Fiber-reinforced composite materials that contain a reinforcing fiber and thermoplastic resins and are formed into predetermined shapes are widely used in various applications such as automotive components and computer-related components.

As a method for producing fiber-reinforced composite material, a method below, for example, is known (Patent Literature 1): arrange a compressible fiber substrate formed using reinforcing fibers with an approximate fiber length of 50 mm in a die, into which a thermoplastic resin is injected; and reduce the volume in the die to compress the content so that the thermoplastic resin is impregnated into the fiber substrate. Such a method is capable of producing complex-shaped fiber-reinforced composite material. However, when the fiber-reinforced composite material is combined with other components such as thermoplastic-resin molded articles, it is difficult to sufficiently increase the adhesive strength at their border.

Also proposed is a molded article of fiber-reinforced composite material formed when a thermoplastic resin is injection-molded to be integrated with fiber-reinforced composite material that contains a reinforcing fiber and thermoplastic resin and is formed into a predetermined shape. As a method for producing such a molded article of fiber-reinforced composite material, Patent Literature 2, for example, discloses the following insert-molding method: arrange in a die a fiber-reinforced resin sheet, which is a non-woven fabric made of reinforcing fibers where one side in a thickness direction is impregnated with thermoplastic resin (A) while the other side remains unimpregnated; and inject thermoplastic resin (B) on the side of the fiber-reinforced resin sheet where reinforcing fibers are exposed so that thermoplastic resin (B) is impregnated into and integrated with the unimpregnated portion of the fiber-reinforced resin sheet. In a method disclosed in Patent Literature 2, the reinforcing fibers are also contained in the injection-molded portion.

CITATION LIST

Patent Literature

Patent Literature 1: WO2012/172982
Patent Literature 2: WO2014/103658

SUMMARY OF THE INVENTION

Problems to be Solved by the Invention

In a method in Patent Literature 2, the border between portions of thermoplastic resin (A) and thermoplastic resin (B) is made irregular so that an anchoring effect is achieved to enhance the adhesive strength. However, in a molded article of the fiber-reinforced composite material obtained by the above method, the adhesive strength may also be insufficient at the border between the inserted portion and injection-molded portion.

The objective of the present invention is to provide a molded article of fiber-reinforced composite material having enhanced adhesive strength at the border between an insert-molded portion made of a fiber-reinforced resin substrate and an integrally molded portion formed to be integrated with the insert-molded portion, and to provide a method for manufacturing such a molded article of fiber-reinforced composite material.

Solutions to the Problems

The present invention has the following aspects.

[1] A method for producing a molded article of fiber-reinforced composite material by integrally molding in a die a fiber-reinforced resin substrate (X) containing thermoplastic resin (x1) and reinforcing fibers (x2) with a fiber length of 3 mm or longer but shorter than 100 mm and a resin composition (Y) containing thermoplastic resin (y1) and reinforcing fibers (y2) with a fiber length of 0.02 mm or longer but shorter than 3 mm, in which relative to the entire volume of reinforcing fibers in fiber-reinforced resin substrate (X), the ratio of the total volume of reinforcing fibers (x2) is 67 vol. % or higher, and the fiber volume ratio in fiber-reinforced resin substrate (X) is 15~50 vol %; relative to the entire volume of reinforcing fibers in resin composition (Y), the ratio of the total volume of reinforcing fibers (y2) is 67 vol. % or higher, and the fiber volume ratio in resin composition (Y) is 5~25 vol. %; and the method includes a step for integrally molding fiber-reinforced resin substrate (X) and resin composition (Y) in a state where reinforcing fibers (x2) are exposed on at least a portion of the surface of fiber-reinforced resin substrate (X).

[2] The method for producing a molded article of fiber-reinforced composite material according to [1], including a step, which is conducted prior to the above molding step, for exposing reinforcing fibers (x2) on at least a portion of the surface of fiber-reinforced resin substrate (X) by applying heat on a portion of fiber-reinforced resin substrate (X) where no reinforcing fibers (x2) are exposed.

[3] The method for producing a molded article of fiber-reinforced composite material according to [1] or [2], in which resin composition (Y) is injected into the die in the molding step.

[4] The method for producing a molded article of fiber-reinforced composite material according to [3], in which resin composition (Y) is injected when fiber-reinforced resin substrate (X) is placed and is being shaped in the die, or after fiber-reinforced resin substrate (X) is placed and shaped in the die.

[5] The method for producing a molded article of fiber-reinforced composite material according to [1] or [2], in which fiber-reinforced resin substrate (X) and resin composition (Y) are press-molded to be integrated with each other in the molding step.

[6] The method for producing a molded article of fiber-reinforced composite material according to any of [1]~[5], in which at least part of thermoplastic resin (x1) is fibrous.

[7] The method for producing a molded article of fiber-reinforced composite material according to any of [1]~[6], in which fiber-reinforced resin substrate (X) is a type of fiber-reinforced resin substrate (X1) which is compressible in a thickness direction.

[8] A molded article of fiber-reinforced composite material, containing reinforcing fibers, thermoplastic resins, and a first layer, second layer and third layer formed in that order, in which the first layer has a thickness of at least 300 μm, the ratio of the total volume of reinforcing fibers (x2) with a fiber length of 3 mm or longer but shorter than 100 mm relative to the entire volume of reinforcing fibers in the layer is set at 67 vol. % or higher, and the fiber volume ratio (Vf1) is 15~50 vol. %; the second layer has a thickness of 100~1500 μm, and relative to the entire volume of reinforcing fibers in the layer, the ratio of the total volume of reinforcing fibers (x2) is more than 33 vol. % while the ratio of the total volume of reinforcing fibers (y2) with a fiber length of 0.02 mm or longer but shorter than 3 mm is set to be lower than 67 vol. %; and the third layer has a thickness of at least 300 μm, the ratio of the total volume of reinforcing fibers (y2) relative to the entire volume of reinforcing fibers in the layer is set at 67 vol. % or higher, and the fiber volume ratio (Vf3) is 5~25 vol. %.

[9] The molded article of fiber-reinforced composite material according to [8], in which the first layer and the third layer are bonded with the second layer placed between them.

[10] The molded article of fiber-reinforced composite material according to [8] or [9], in which the fiber volume ratio (Vf1) in the first layer, the fiber volume ratio (Vf2) in the second layer and the fiber volume ratio (Vf3) in the third layer satisfy formula (1) below.

$$Vf3 < Vf2 < Vf1 \qquad (1)$$

Effects of the Invention

The manufacturing method according to the present invention is capable of producing a molded article of fiber-reinforced composite material, which exhibits excellent adhesive strength at the border between the insert-molded portion made of a fiber-reinforced resin substrate and an integrally molded portion formed to be integrated with the insert-molded portion.

The obtained molded article of fiber-reinforced composite material exhibits excellent adhesive strength at the border between the insert-molded portion made of a fiber-reinforced resin substrate and an integrally molded portion formed to be integrated with the insert-molded portion.

DETAILED DESCRIPTION OF THE EMBODIMENTS

In the present application, an insert-molded portion means a portion where fiber-reinforced resin substrate (X) is present in a molded article of fiber-reinforced composite material. An integrally molded portion means a portion formed only with resin composition (Y). In fiber-reinforced resin substrate (X), when resin composition (Y) is filled into an exposed portion of reinforcing fibers (x2), the portion is referred to as an insert-molded portion.

[Molded Article of Fiber-Reinforced Composite Material]

The molded article of fiber-reinforced composite material related to the present invention contains reinforcing fibers and thermoplastic resin, and has a first layer, second layer and third layer in that order.

The molded article of fiber-reinforced composite material related to the present invention is manufactured using, for example, a later-described manufacturing method related to the present invention. The molded article of fiber-reinforced composite material obtained by the manufacturing method related to the present invention has an insert-molded portion formed with fiber-reinforced resin substrate (X) and resin composition (Y), and an integrally molded portion formed to be integrated with the insert-molded portion using resin composition (Y). The first and second layers are located in the insert-molded portion and the third layer is located in the integrally molded portion.

Figure 4:
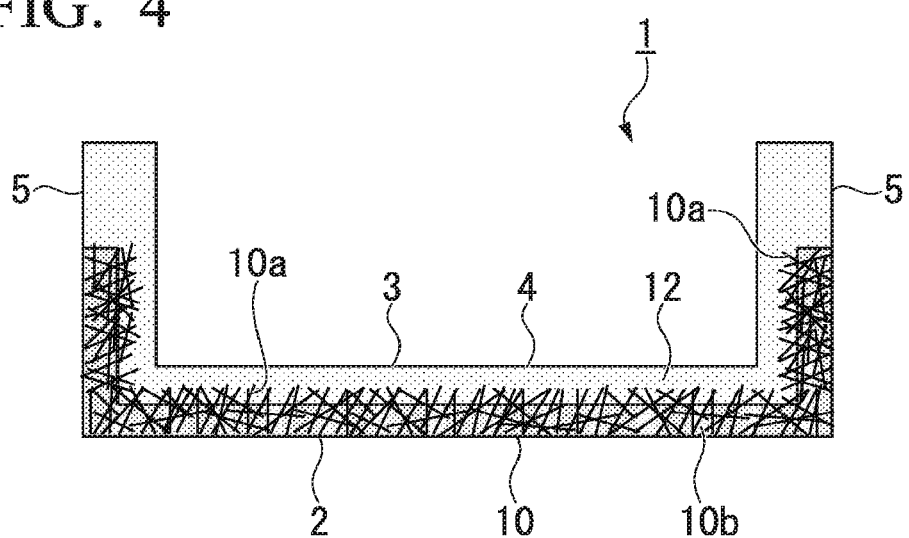
FIG. 4 is a view showing an example of the molded article of fiber-reinforced composite material obtained by the manufacturing method related to the present invention.
Figure 5:
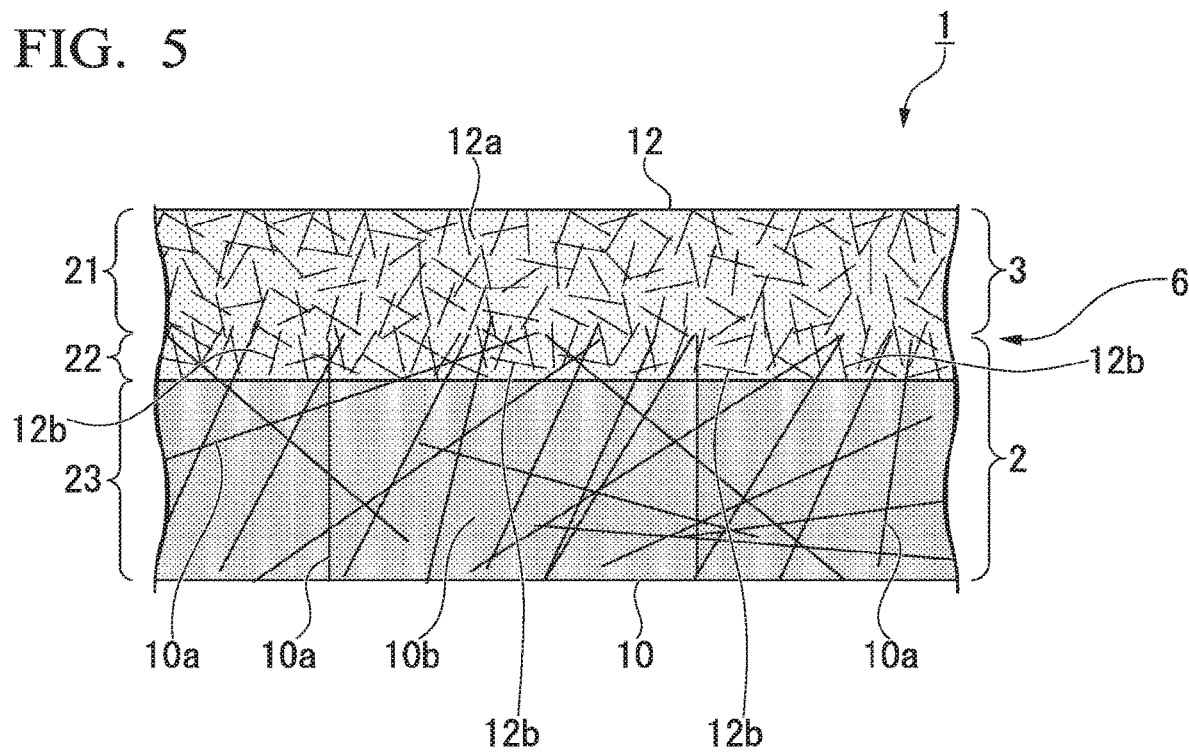
FIG. 5 is an enlarged cross-sectional view of the molded article of fiber-reinforced composite material shown in FIG. 4.

An example of the molded article of fiber-reinforced composite material related to the present invention is described below. As shown in FIGS. 4 and 5, molded article 1 of fiber-reinforced composite material according the present embodiment has insert-molded portion 2 containing fiber-reinforced resin substrate (X) 10 and integrally molded portion 3 formed with resin composition (Y) 12. Moreover, in molded article 1 of fiber-reinforced composite material, insert-molded portion 2 and integrally molded portion 3 have plate portion 4 and side portions (5, 5) formed to be upright on both ends of plate portion 4.

In molded article 1 of fiber-reinforced composite material, first layer 23, second layer 22 and third layer 21 are positioned from insert-molded portion 2 toward integrally molded portion 3 in a thickness direction. First layer 23 and second layer 22 are located in insert-molded portion 2, and third layer 21 is located in integrally molded portion 3.

(First Layer)

First layer 23 contains a thermoplastic resin and reinforcing fibers (x2) with a fiber length of 3 mm or longer but shorter than 100 mm.

The thermoplastic resin is not limited particularly and may be selected from the following, for example: polyamide resins (such as nylon 6, nylon 66, nylon 12 and nylon MXD6), polyolefin resins (such as low-density polyethylene, high-density polyethylene and polypropylene), modified polyolefin resins (such as modified polypropylene resin), polyester resins (such as polyethylene terephthalate and polybutylene terephthalate), polycarbonate resins, polyamide-imide resins, polyphenylene oxide resins, polysulfone resins, polyethersulfone resins, polyether ether ketone resins, polyether imide resins, polystyrene resins, ABS resins, polyphenylene sulfide resins, liquid crystal polyester resins, acrylonitrile-styrene copolymers, nylon 6-nylon 66 copolymers, and the like. As for modified polyolefin resins, for example, modified polyolefin resins by an acid such as maleic acid may be used. Those thermoplastic resins may be used alone or in combination thereof.

Reinforcing fibers (x2) are a type of reinforcing fiber with a fiber length of 3 mm or longer but shorter than 100 mm.

Reinforcing fibers (x2) are not limited to any particular type, as long as they are normally used in molded articles of fiber-reinforced composite material. Examples are inorganic fibers, organic fibers, metallic fibers or hybrid reinforcing fibers obtained by combining those fibers. Examples of inorganic fibers are carbon fibers, graphite fibers, silicon carbide fibers, alumina fibers, tungsten carbide fibers, boron fibers, glass fibers, and the like. Examples of organic fibers are aramid fibers and the like. Examples of metallic fibers are fibers made of stainless steel, iron or the like, and may be metal-coated carbon fibers. Among those listed above, carbon fibers are preferred considering their mechanical properties such as the strength of molded articles of fiber-reinforced composite material. As for reinforcing fibers (x2), one type or more than one type of reinforcing fiber may be used.

The fiber length of reinforcing fibers (x2) is 3 mm or longer but shorter than 100 mm; the fiber length is preferred to be 3~75 mm, more preferably 5~50 mm. When the fiber length of reinforcing fibers (x2) is at or above the aforementioned lower limit, a molded article of fiber-reinforced composite material is obtained to exhibit excellent mechanical characteristics. When the fiber length of reinforcing fibers (x2) is no greater than the aforementioned upper limit, moldability is excellent during the manufacturing process.

The first layer may contain any other reinforcing fibers in addition to reinforcing fibers (x2). The type of other reinforcing fibers is not limited particularly; examples are those listed for reinforcing fibers (y2) in the second layer and reinforcing fibers with a fiber length of 100 mm or longer.

The thickness of the first layer is 300 μm or more, preferably 500 μm or more. If the thickness of the first layer is at or above the aforementioned lower limit, a molded article of the fiber-reinforced composite material is obtained to exhibit excellent mechanical characteristics. The upper limit of its thickness is not limited particularly, and may be set appropriately. For practical purposes, the upper limit is about 50 mm, for example.

The ratio of the total volume of reinforcing fibers (x2) relative to the entire volume of reinforcing fibers in the first layer is 67 vol. % or higher, preferably 75~100 vol. %, more preferably 80~100 vol. %. If the volume of longer reinforcing fibers is excessive, the moldability may be lowered, and if the volume of shorter reinforcing fibers is excessive, mechanical characteristics are lowered in the molded article of the fiber-reinforced composite material. When the ratio is within the above range, moldability and strength are well balanced.

The fiber volume ratio (Vf1) in the first layer is 15~50 vol. %, preferably 20~45 vol. %, more preferably 25~40 vol. %. If the fiber volume ratio (Vf1) is at or above the aforementioned lower limit, the obtained molded article of fiber-reinforced composite material exhibits excellent mechanical characteristics. A fiber volume ratio (Vf1) of no greater than the upper limit makes it easier to shape the molded article during the manufacturing process.

[Second Layer]

Second layer 22 contains a thermoplastic resin, reinforcing fibers (x2), and reinforcing fibers (y2) with a fiber length of 0.02 mm or longer but shorter than 3 mm. The second layer may also contain reinforcing fibers other than reinforcing fibers (x2) and reinforcing fibers (y2).

As for the thermoplastic resin contained in the second layer, it is not limited particularly, and may be the same as that contained in the first layer. The thermoplastic resin in the second layer may be one type or more than one type.

Reinforcing fibers (y2) are a type with a fiber length of 0.02 mm or longer but shorter than 3 mm. The type of reinforcing fibers (y2) may be the same as those listed for reinforcing fibers (x2). Considering mechanical characteristics such as the strength of a molded article of fiber-reinforced composite material, it is preferred to use carbon fibers as reinforcing fibers (y2).

The fiber length of reinforcing fibers (y2) is 0.02 mm or longer but shorter than 3 mm, preferably 0.04~1.5 mm, more preferably 0.07~1.3 mm. When the fiber length of reinforcing fibers (y2) is at or above the aforementioned lower limit, the adhesive strength at the border between the insert-molded portion and the integrally molded portion is enhanced in the molded article of fiber-reinforced composite material. A fiber length of reinforcing fibers (y2) of no greater than the above upper limit makes it easier for reinforcing fibers (y2) to penetrate the exposed portion of reinforcing fibers (x2) in fiber-reinforced resin substrate (X) during the later-described molding process. Accordingly, during the manufacturing process, it is easier for reinforcing fibers (y2) to penetrate the portion in the second layer where reinforcing fibers (x2) are exposed on fiber-reinforced resin substrate (X). Therefore, such a condition enhances the adhesive strength of the first and third layers with the second layer placed between them, namely, the adhesive strength at the border between the insert-molded portion and the integrally molded portion.

The thickness of the second layer is 100~1500 μm, preferably 200~1250 μm, more preferably 300~1000 μm. The thickness of the second layer set to be at or above the aforementioned lower limit enhances the adhesive strength at the border between the insert-molded portion and the integrally molded portion in the molded article of the fiber-reinforced composite material. Since the second layer has a relatively short fiber length compared with the first layer, an excessively thick second layer may lower the mechanical characteristics of a molded article of fiber-reinforced composite material. However, when the thickness of the second layer is no greater than the above upper limit, the obtained molded article of the fiber-reinforced composite material exhibits excellent mechanical characteristics.

The ratio of the total volume of reinforcing fibers (x2) relative to the entire volume of reinforcing fibers in the second layer is more than 33 vol. %, preferably 36~64 vol. %, more preferably 40~60 vol. %.

The ratio of the total volume of reinforcing fibers (y2) relative to the entire volume of reinforcing fibers in the second layer is lower than 67 vol. %, preferably 36~64 vol. %, more preferably 40~60 vol. %. Setting the ratio of the total volume of reinforcing fibers (x2) and the ratio of the total volume of reinforcing fibers (y2) in the above respective ranges contributes to achieving excellent adhesive strength at the border between the insert-molded portion and the integrally molded portion in the molded article of the fiber-reinforced composite material.

The fiber volume ratio (Vf2) in the second layer is preferred to be 8~42 vol. %, more preferably 12~37 vol. %, even more preferably 15~33 vol. %. If the fiber volume ratio (Vf2) is at or above the aforementioned lower limit, the obtained molded article of the fiber-reinforced composite material exhibits excellent mechanical characteristics. If the fiber volume ratio (Vf2) is no greater than the upper limit, reinforcing fibers (x2) and reinforcing fibers (y2) are more likely to become entangled with each other in the second layer, thus further enhancing adhesive strength at the border between the insert-molded portion and the integrally molded portion in the molded article of the fiber-reinforced composite material.

(Third Layer)

Third layer 21 contains a thermoplastic resin and reinforcing fibers (y2). The third layer may also contain reinforcing fibers other than reinforcing fibers (y2). Examples of reinforcing fibers other than reinforcing fibers (y2) are, for example, reinforcing fibers (x2).

The thickness of the third layer is at least 300 μm, preferably at least 500 μm. If the thickness of the third layer is at or above the lower limit, the obtained molded article of the fiber-reinforced composite material exhibits excellent mechanical characteristics. The upper limit of its thickness is not limited particularly, and may be set appropriately.

The ratio of the total volume of reinforcing fibers (y2) relative to the entire volume of reinforcing fibers in the third layer is 67 vol. % or higher, preferably 75~100 vol. %, more preferably 80~100 vol. %. An excessive amount of longer reinforcing fibers makes it harder for reinforcing fibers (y2) to penetrate the exposed portion of reinforcing fibers (x2) in fiber-reinforced resin substrate (X) in the later-described molding process. An excessive amount of shorter reinforcing fibers makes it harder to achieve the effect of reinforcing fibers (y2). As described, regardless of an excessive amount of longer or shorter reinforcing fibers, the adhesive strength tends to decrease at the border between the insert-molded portion and the integrally molded portion in the molded article of the fiber-reinforced composite material.

When the ratio is within the above range, excellent adhesive strength is obtained at the border between the insert-molded portion and the integrally molded portion in the molded article of the fiber-reinforced composite material.

The fiber volume ratio (Vf3) in the third layer is 5~25 vol. %, preferably 8~22 vol. %, more preferably 10~20 vol. %. If the fiber volume ratio (Vf3) is at or above the aforementioned lower limit, the obtained molded article of fiber-reinforced composite material exhibits excellent mechanical characteristics. If the fiber volume ratio (Vf3) is no greater than the upper limit, excellent adhesive strength is obtained at the border between the insert-molded portion and the integrally molded portion in the molded article of the fiber-reinforced composite material.

To achieve an even more excellent adhesive strength at the border between the insert-molded portion made of fiber-reinforced resin substrate and the integrally molded portion to be integrated with the insert-molded portion, the fiber volume ratio (Vf1) in the first layer, the fiber volume ratio (Vf2) in the second layer and the fiber volume ratio (Vf3) in the third layer are preferred to satisfy the formula (1) below.

$$Vf3 < Vf2 < Vf1 \quad (1)$$

In molded articles of fiber-reinforced composite material, the first, second and third layers are determined by the methods described in the examples. In molded articles of fiber-reinforced composite material related to the present invention, the first and third layers are preferred to be bonded with the second layer placed in between. In other words, no other layer is present between the first and second layers or between the second and third layers, so that the first, second and third layers are in contact with each other to make a continuous formation. Molded articles of fiber-reinforced composite material related to the present invention are especially preferred to be triple-layered, having first, second and third layers arranged in that order.

[Method for Manufacturing Molded Article of Fiber-Reinforced Composite Material]

According to the method related to the present invention, a molded article of fiber-reinforced composite material is manufactured by integrally molding the following in a die: fiber-reinforced resin substrate (X) containing thermoplastic resin (x1) and reinforcing fibers (x2) with a fiber length of 3 mm or longer but shorter than 100 mm, and resin composition (Y) containing thermoplastic resin (y1) and reinforcing fibers (y2) with a fiber length of 0.02 mm or longer but shorter than 3 mm. Using the method related to the present invention, the above-mentioned molded article of fiber-reinforced composite material is obtained. The molded article of fiber-reinforced composite material manufactured by the method related to the present invention contains an insert-molded portion made of fiber-reinforced resin substrate (X) and an integrally molded portion formed to be integrated with the insert-molded portion.

The method for manufacturing a molded article of fiber-reinforced composite material related to the present invention includes a molding step for integrating fiber-reinforced resin substrate (X) and resin composition (Y) in a state where reinforcing fibers (x2) are exposed on at least one part of the surface of fiber-reinforced resin substrate (X).

(Fiber-Reinforced Resin Substrate (X))

A fiber-reinforced resin substrate (X) is a substrate containing thermoplastic resin (x1) and reinforcing fibers (x2), for example, a substrate obtained by impregnating thermoplastic resin (x1) into a fiber substrate containing reinforcing fibers (x2). Alternatively, fiber-reinforced resin substrate (X) may use a fiber substrate made of reinforcing fibers (x2) and another type of fibers made of thermoplastic resin (x1). As described, at least one portion of thermoplastic resin (x1) may be made fibrous in fiber-reinforced resin substrate (X). On the surface of a fiber substrate, reinforcing fibers (x2) are not impregnated with thermoplastic resin (x1) and are exposed in a portion where reinforcing fibers (x2) are mixed with fibrous thermoplastic resin (X2). In the present application, the fibers made of thermoplastic resin (x1) are not categorized as reinforcing fibers.

Examples of fiber substrates are non-woven fabrics obtained by forming a sheet using numerous reinforcing fibers (x2) and fibers made of thermoplastic resin (x1), or using reinforcing-fiber bundles (strands) formed by bundling numerous reinforcing fibers (x2) and fibers made of thermoplastic resin (x1). The mode of such a non-woven fabric is not limited particularly; examples are chopped-strand mats, continuous-strand mats, mats formed by a paper-making process, carded mats, AirLaid mats and the like.

Fibers made of thermoplastic resin (x1) are generally flexible compared with reinforcing fibers (x2) such as carbon fibers and the like. Thus, when reinforcing fibers (x2) are combined with fibers made of thermoplastic resin (x1), it is easier for the fibers to become entangled with each other, suppressing trouble such as breakage and bending of reinforcing fibers (x2) during the manufacturing process of fiber-reinforced resin substrate (X). When reinforcing fibers (x2) are combined with fibers made of thermoplastic resin (x1), after the substrate is formed, it is preferred to melt some or all of the fibers made of thermoplastic resin (x1) and to solidify the fibers accordingly so that reinforcing fibers (x2) are bonded with thermoplastic resin (x1). By so doing, reinforcing fibers (x2) are less likely to peel off fiber-reinforced resin substrate (X).

As for thermoplastic resin (x1), it is not limited particularly; examples are those thermoplastic resins listed in the description of molded articles of fiber-reinforced composite material. For thermoplastic resin (x1), it may be one or more than one type.

The length of fibers made of thermoplastic resin (x1) is not limited particularly and may be set at 1~100 mm, for example. Fibers made of thermoplastic resin (x1) are preferred to be crimped since they are more likely to become entangled with each other. For thermoplastic resin (x1), it may be one type or more than one type in combination.

When fiber-reinforced resin substrate (X) contains fibers made of thermoplastic resin (x1), the ratio of reinforcing fibers (x2) relative to the entire volume of fibers in fiber-reinforced resin substrate (X) is preferred to be 15~95 vol. %, more preferably 20~90 vol. %. A ratio of reinforcing fibers (x2) set at or above the aforementioned lower limit makes it easier to obtain a molded article of fiber-reinforced composite material that exhibits excellent mechanical characteristics. A ratio of reinforcing fibers (x2) of no greater than the upper limit makes it easier to achieve the effect derived from the fibers made of thermoplastic resin (x1).

Examples of fiber-reinforced resin substrate (X) impregnated with thermoplastic resin (x1) are those obtained by impregnating thermoplastic resin (x1) into a fiber substrate made using only reinforcing fibers (x2); those obtained by impregnating thermoplastic resin (x1) into a fiber substrate formed with reinforcing fibers (x2) and fibers made of thermoplastic resin (x1); and the like.

In fiber-reinforced resin substrate (X), other reinforcing fibers in addition to reinforcing fibers (x2) may be contained within a range that does not deviate from the gist of the present invention. In other words, fiber-reinforced resin substrate (X) may contain reinforcing fibers with a fiber length shorter than 3 mm or exceeding 100 mm.

Fiber-reinforced resin substrate (X) may also contain additives such as a flame retardant, weathering improver, antioxidant, thermal stabilizer, ultraviolet absorber, plasticizer, lubricant, colorants, compatibilizer and conductive filler, depending on the desired properties of a target molded article of fiber-reinforced composite material.

The ratio of the total volume of reinforcing fibers (x2) relative to the entire volume of reinforcing fibers in fiber-reinforced resin substrate (X) is 67 vol. % or higher, preferably 75~100 vol. %, more preferably 80~100 vol. %. If the volume of longer reinforcing fibers is excessive, the moldability may be lowered, and if the volume of shorter reinforcing fibers is excessive, mechanical characteristics may be lowered in the molded article of fiber-reinforced composite material. If the ratio is within the above range, the moldability and strength are well balanced.

The fiber volume ratio in fiber-reinforced resin substrate (X) is 15~50 vol. %, preferably 20~45 vol. %, more preferably 25~40 vol. %. If the fiber volume ratio in fiber-reinforced resin substrate (X) is at or above the aforementioned lower limit, the obtained molded article of fiber-reinforced composite material exhibits sufficient mechanical characteristics. If the fiber volume ratio in fiber-reinforced resin substrate (X) is no greater than the upper limit, moldability during the production process is excellent.

Reinforcing fibers (x2) are exposed at least on part of the surface of fiber-reinforced resin substrate (X) during a molding process. When resin composition (Y) is integrally molded with fiber-reinforced resin substrate (X) placed in a die when reinforcing fibers (x2) are partially exposed thereon, it is easier to fill resin composition (Y) into the exposed portion. Examples of fiber-reinforced resin substrate (X) with reinforcing fibers (x2) exposed on at least part of its surface are not limited particularly, for example, it may be those having a portion impregnated with thermoplastic resin (x1) on one side in a thickness direction whereas the other side is left unimpregnated. As for fiber-reinforced resin substrate (X) where reinforcing fibers (x2) are exposed on at least part of its surface, it may be formed using only reinforcing fibers (x2) and fibers made of thermoplastic resin (x1).

As for fiber-reinforced resin substrate (X), it is preferred to use fiber-reinforced resin substrate (X1) which is compressible in a thickness direction. By so setting, it is easier to obtain a molded article of fiber-reinforced composite material that exhibits a higher adhesive strength at the border between the insert-molded portion and the integrally molded portion.

In the present application, a fiber-reinforced resin substrate compressible in a thickness direction means it has a compression rate ($P_A$) of 30% or higher when compressed under conditions of 23° C. and 2 MPa. When thermoplastic resin (x1) is impregnated into part of fiber-reinforced resin substrate (X1), its compression rate ($P_A$) means the value determined by excluding the portion impregnated with resin, namely, the value obtained by measuring only the unimpregnated portion.

In accordance with the method in JIS L1913, when the compression rate is referred to as (P), the thickness of fiber-reinforced resin substrate (X1) with an initial load exerted thereon as specified in JIS L1913 is set as ($T_0$), and its thickness with an optional load exerted thereon is set as ($T_1$), the compression rate is calculated as $P=(T_0-T_1)/(T_0) \times 100$. When thermoplastic resin (x1) is impregnated into part of fiber-reinforced resin substrate (X1), and when the thickness is referred to as ($T_2$) for the portion impregnated with thermoplastic resin (x1), the compression rate is calculated as $P=(T_0-T_1)/(T_0-T_2) \times 100$. The thickness ($T_2$) of the portion impregnated with thermoplastic resin (x1) is obtained by mirror polishing a cross section of fiber-reinforced resin substrate (X1) and by observing the cross section through an optical microscope.

The compression rate ($P_A$) of fiber-reinforced resin substrate (X1) is preferred to be 30% or higher, more preferably 40~80%. If the compression rate ($P_A$) is at or above the aforementioned lower limit, a higher adhesive strength is achieved at the border between the insert-molded portion and the integrally molded portion. Moreover, resin composition (Y) is sufficiently filled in the exposed portion of reinforcing fibers (x2) in fiber-reinforced resin substrate (X1), and the obtained molded article of fiber-reinforced composite material thereby exhibits excellent mechanical characteristics. On the other hand, if the compression rate ($P_A$) is extremely high, the amount derived from the fiber-reinforced resin substrate (X1) is insufficient in the insert-molded portion of the molded article of fiber-reinforced composite material, thereby lowering the mechanical characteristics of the insert-molded portion. However, if the compression rate ($P_A$) is no greater than the upper limit, it is easier to achieve a molded article of fiber-reinforced composite material that exhibits excellent mechanical characteristics without decreasing the mechanical characteristics of the insert-molded portion.

When fiber-reinforced resin substrate (X1) is compressed at 10 MPa, the compression rate ($P_B$) is preferred to be 98% or lower, more preferably 45~97%. If the compression rate ($P_B$) is at or above the aforementioned lower limit, adhesive strength is higher at the border between the insert-molded portion and the integrally molded portion while resin composition (Y) is sufficiently filled in the exposed portion of reinforcing fibers (x2) in fiber-reinforced resin substrate (X1) Accordingly, it is easier to achieve a molded article of fiber-reinforced composite material that exhibits excellent mechanical characteristics. On the other hand, if the compression rate ($P_B$) is extremely high, a residual force may occur in the insert-molded portion in the molded article of fiber-reinforced composite material so as to cause fiber-reinforced resin substrate (X1) to revert to its state prior to compression. Accordingly, the molded article of fiber-reinforced composite material may warp and its dimensional accuracy may be lowered. However, if the compression rate ($P_B$) is no greater than the upper limit, it is easier to achieve a molded article of fiber-reinforced composite material that exhibits excellent dimensional accuracy.

When thermoplastic resin (x1) is impregnated into part of fiber-reinforced resin substrate (X1), the compression rate ($P_B$) means the value obtained by excluding the resin-impregnated portion.

As for fiber-reinforced resin substrate (X1), it is an option to use fiber-reinforced resin substrate (X1) compressible in a thickness direction by the expansion coming from springback caused by heat. Fiber-reinforced resin substrate (X11) has a compression rate ($P_A$) of less than 70% before being heated, but its compression rate ($P_A$) is increased to 70% or higher when heated. For example, when fiber-reinforced resin substrate (X1), part of which is impregnated with thermoplastic resin (x1), is heated and shaped in a die by applying heat at or above the softening temperature of thermoplastic resin (x1), it is an option to use fiber-reinforced resin substrate (X11) compressible in a thickness direction when heated.

The manufacture of fiber-reinforced resin substrate (X) is not limited to any particular method, and any known method may be employed. As a method for manufacturing a fiber substrate made of a non-woven fabric containing reinforcing fibers (x2) or fibers obtained by combining reinforcing fibers (x2) and thermoplastic resin (x1), an AirLaid method, a carding method, a paper-making method or the like may be used.

To impregnate thermoplastic resin (x1) into a fiber substrate made of a non-woven fabric, for example, a resin film made of thermoplastic resin (x1) is laminated on one side of the non-woven fabric, and thermoplastic resin (x1) is heated to melt it while pressure is added by a compression-molding machine. Examples of a compression-molding machine are a double-belt press, and calender rolls or the like.

[Resin Composition (Y)]

Resin composition (Y) contains thermoplastic resin (y1) and reinforcing fibers (y2).

(Thermoplastic Resin (y1))

Thermoplastic resin (y1) is not limited to any particular type, and thermoplastic resins listed in the description of a molded article of fiber-reinforced composite material above may be used, for example. Thermoplastic resin (y1) is preferred to be the same resin as that of thermoplastic resin (x1) contained in fiber-reinforced resin substrate (X) because a higher adhesive strength is achieved at the border between the insert-molded portion and the integrally molded portion. As for thermoplastic resin (y1), it may be one type or more than one type in combination.

Resin composition (Y) may contain other reinforcing fibers in addition to reinforcing fibers (y2). For example, resin composition (Y) may also contain reinforcing fibers with a length shorter than 0.02 mm or exceeding 3 mm in addition to thermoplastic resin (y1) and reinforcing fibers (y2). The ratio of the total volume of reinforcing fibers (y2) relative to the entire volume of reinforcing fibers in resin composition (Y) is 67 vol. % or higher, preferably 75~100 vol. %, more preferably 80~100 vol. %. If the volume of longer reinforcing fibers is excessive, reinforcing fibers (y2) are hard to penetrate the exposed portion of reinforcing fibers (x2) in fiber-reinforced resin substrate (X). Moreover, if the volume of shorter reinforcing fibers is excessive, it is hard to achieve the effect derived from reinforcing fibers (y2). As described, regardless of an excessive amount of longer or shorter reinforcing fibers, the adhesive strength tends to decrease at the border between the insert-molded portion and the integrally molded portion in the molded article of fiber-reinforced composite material. When the ratios are within the above specified ranges, a molded article of fiber-reinforced composite material is obtained to exhibit excellent adhesive strength at the border between the insert-molded portion and the integrally molded portion.

When the fiber length of reinforcing fibers (x2) in fiber-reinforced resin substrate (X) and the fiber length of reinforcing fibers (y2) in resin composition (Y) are sufficiently different, the ratio of reinforcing fibers (y2) in resin composition (Y) is assumed from the total volume of reinforcing fibers (y2) relative to the entire volume of reinforcing fibers in the third layer of the molded article of fiber-reinforced composite material.

The fiber volume ratio in resin composition (Y) is 5~25 vol. %, preferably 8~22 vol. %, more preferably 10~20 vol. %. If the fiber volume ratio in resin composition (Y) is at or above the aforementioned lower limit, a molded article of fiber-reinforced composite material is obtained to exhibit excellent mechanical characteristics. If the fiber volume ratio in resin composition (Y) is no greater than the upper limit, the obtained molded article of fiber-reinforced composite material exhibits excellent adhesive strength at the border between the insert-molded portion and the integrally molded portion.

The content of reinforcing fibers (y2) in resin composition (Y) is preferred to be 5~50 parts, more preferably 10~35 parts, by mass per 100 parts by mass of thermoplastic resin (y1). If the content of reinforcing fibers (y2) is at or above the aforementioned lower limit, it is easier to obtain a molded article of fiber-reinforced composite material that exhibits excellent adhesiveness at the border between the insert-molded portion and the integrally molded portion. If the content of reinforcing fibers (y2) is no greater than the upper limit, it is easier to fill resin composition (Y) in the exposed portion of reinforcing fibers (x2) in fiber-reinforced resin substrate (X), and the obtained molded article of fiber-reinforced composite material is more likely to exhibit excellent mechanical characteristics.

Resin composition (Y) is manufactured when a thermoplastic resin (y1) and reinforcing fibers (y2) are kneaded by a known method using a biaxial extrusion kneading machine or the like. In addition, as resin composition (Y), commercially available fiber-reinforced thermoplastic resin pellets may be injection molded.

Resin composition (Y) may also contain additives such as a flame retardant, weathering improver, antioxidant, thermal stabilizer, ultraviolet absorber, plasticizer, lubricant, colorants, compatibilizer and conductive filler, depending on the desired properties of a target molded article of fiber-reinforced composite material.

(Molding Process)

In a molding process, fiber-reinforced resin substrate (X) and resin composition (Y) are integrally molded by placing in a die fiber-reinforced resin substrate (X) in a state where reinforcing fibers (x2) are exposed on at least part of its surface.

In an embodiment of the present invention, it is an option to use fiber-reinforced resin substrate (X) where no reinforcing fibers (x2) are exposed and to conduct a step for exposing reinforcing fibers (x2) on at least part of the surface of fiber-reinforced resin substrate (X) prior to the molding process. More specifically, prior to the molding process, a step for exposing reinforcing fibers (x2) is conducted by applying heat on the portion of fiber-reinforced resin substrate (X) where no reinforcing fibers (x2) are exposed so that reinforcing fibers (x2) are exposed on at least part of the surface of fiber-reinforced resin substrate (X). In such a case, the exposure step on fiber-reinforced resin substrate (X), where no reinforcing fibers (x2) are exposed, may be conducted outside the die, or inside the die after fiber-reinforced resin substrate (X) is placed therein.

To integrally mold fiber-reinforced resin substrate (X) and resin composition (Y), injection molding, for example, may be employed. Namely, under conditions where reinforcing fibers (x2) are exposed on at least part of the surface of fiber-reinforced resin substrate (X), resin composition (Y) is injected into the die. Resin composition (Y) is impregnated into the exposed portion of reinforcing fibers (x2) so as to be integrally molded with fiber-reinforced resin substrate (X).

When injection molding is employed, fiber lengths tend to be shortened because of breakage or the like of fibers that occurs when the resin composition is flowed through an injection machine driven by a screw. Accordingly, considering the fiber lengths to be shortened due to such reasons, reinforcing fibers in the resin composition to be fed into an injection machine are preferred to have a longer fiber length than the fiber length of reinforcing fibers (y2). The fiber length of reinforcing fibers to be fed into an injection machine is preferred to be 0.1~10.0 mm, more preferably 0.2~6.0 mm, even more preferably 0.3~3.0 mm.

Moreover, it is preferred to shape fiber-reinforced resin substrate (X) using a die used for injection molding. More preferably, fiber-reinforced resin substrate (X) is placed in a die, and resin composition (Y) is injected into the die while or after fiber-reinforced resin substrate (X) is shaped. Accordingly, it is not necessary to shape fiber-reinforced resin substrate (X) in advance, thus enhancing productivity and achieving better cost performance.

For injection-molding while fiber-reinforced resin substrate (X) is being shaped, it is an option to place fiber-reinforced resin substrate (X) in a die, which is closed while resin composition (Y) is being injected, or to place fiber-reinforced resin substrate (X) in a die, which is closed after resin composition (Y) is injected; and the like.

For injection-molding a resin composition after fiber-reinforced resin substrate (X) is shaped, it is an option to close the die so as to shape fiber-reinforced resin substrate (X) placed therein, and then to inject resin composition (Y) into the die, for example.

In such a method, after the die is closed to shape fiber-reinforced resin substrate (X), it is preferred to tentatively open the die, into which resin composition (Y) is injected, and then to close the die again to compress resin composition (Y) therein so that resin composition (Y) is compressed to be integrated with fiber-reinforced resin substrate (X). By so doing, it is easier to compress resin composition (Y) provided into the die, and resin composition (Y) is more likely to be impregnated into the exposed portion of reinforcing fibers (x2) in fiber-reinforced resin substrate (X).

Moreover, to reduce the energy consumption required to open the die tentatively, to shorten the molding time, or to simplify the die design, after the die is closed to shape fiber-reinforced resin substrate (X), it is preferred to set the die to be tentatively openable by the injection pressure exerted for injecting resin composition (Y).

For integrally molding fiber-reinforced resin substrate (X) and resin composition (Y), press-molding may also be employed. Namely, under conditions where reinforcing fibers (x2) are exposed on at least a portion of the surface of fiber-reinforced resin substrate (X), resin composition (Y) may be arranged in a die and press-molded so as to be impregnated into the exposed portion of reinforcing fibers (x2) in reinforced resin substrate (X) and to be integrated with fiber-reinforced resin substrate (X). It is preferred to shape fiber-reinforced resin substrate (X) by using a press-molding die.

In a molding process, when fiber-reinforced resin substrate (X) is shaped in a die, fiber-reinforced resin substrate (X) is heated at least to the softening temperature of thermoplastic resin (x1). In such a process, fiber-reinforced resin substrate (X) may be placed in a die after it is heated at least to the softening temperature, or fiber-reinforced resin substrate (X) may be placed in a die and is heated at least to the softening temperature. The method for heating fiber-reinforced resin substrate (X) is not limited particularly, and an infrared heater or the like is used, for example.

Temperature (T) (° C.) of fiber-reinforced resin substrate (X) during a shaping process relative to the softening temperature ($T_A$) (° C.) of thermoplastic resin (x1) is in a relationship of $T_A \leq T$, preferably $T_A+10$ (° C.)$\leq T \leq T_A+150$ (° C.), more preferably $T_A+30$ (° C.)$\leq T \leq T_A+100$ (° C.). If temperature (T) is at or above the aforementioned lower limit, it is easier to obtain a molded article of fiber-reinforced composite material that exhibits a higher adhesive strength at the border between the insert-molded portion and the integrally molded portion, while the molding time is shortened. Too high a temperature (T) extends the time after the die is closed before thermoplastic resin (x1) solidifies, thereby causing trouble such as lowered productivity, or thermal decomposition of thermoplastic resin (x1). If temperature (T) is no greater than the upper limit, thermoplastic resin (x1) solidifies at an appropriate time frame after the die is closed, and it is easier to suppress thermal decomposition of thermoplastic resin (x1).

Regarding the temperature at the time of closing the die, it is preferred to be at least 5° C. lower, more preferably at least 15° C. lower, than the lowest softening temperature of either of thermoplastic resin (y1) and thermoplastic resin (x1). By so setting, the thermoplastic resins in the molded article of fiber-reinforced composite material are sufficiently cooled and solidified, making it easier to take the molded article out of the die.

Figure 1:
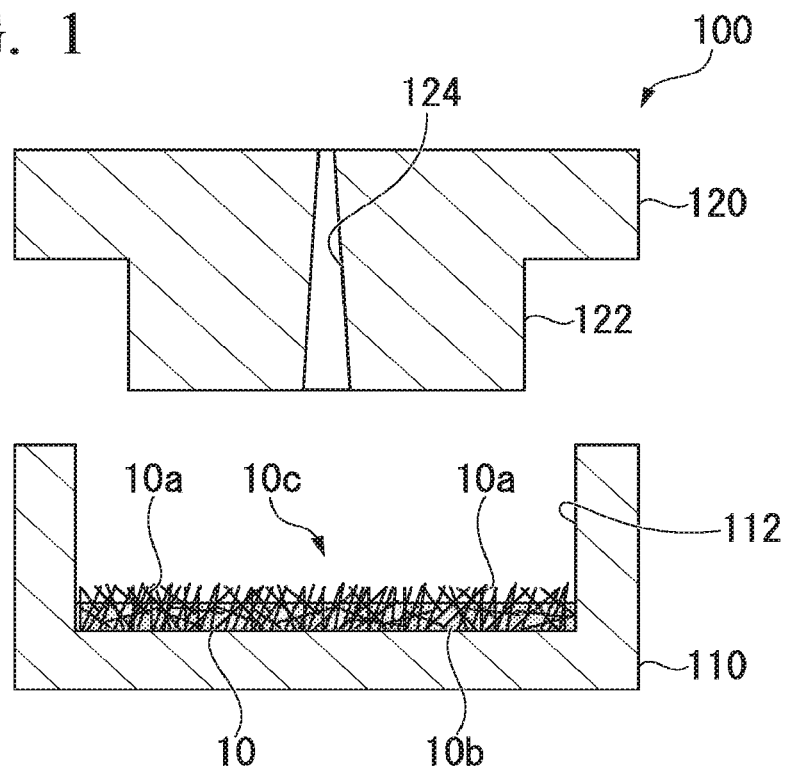
FIG. 1 is a cross-sectional view showing a step in a method for manufacturing a molded article of fiber-reinforced composite material related to the present invention.

As an example of the method for manufacturing a molded article of fiber-reinforced composite material related to the present invention, an embodiment is described using die 100 shown in FIG. 1.

Die 100 has lower die 110 with concave portion 112 formed on the upper-surface side, and upper die 120 with convex portion 122 protruding downward. In upper die 120, resin channel 124 is formed for injection of resin from the lower surface of convex portion 122. When die 100 is closed by setting upper die 120 to be adjacent to lower die 110, a cavity in a shape complementary to that of the target molded article of fiber-reinforced composite material is formed between concave portion 112 and convex portion 122 in die 100.

In a manufacturing method using die 100, fiber-reinforced resin substrate (X) 10 is placed in concave portion 112 of lower die 110 as shown in FIG. 1. In fiber-reinforced resin substrate (X) 10, reinforcing fibers (x2) 10a are made into a sheet; thermoplastic resin (x1) 10b is impregnated into one side of the sheet in a thickness direction while unimpregnated reinforcing fibers (x2) are left as exposed portion 10c on the other side of the sheet. In the example, fiber-reinforced resin substrate (X) 10 is placed in concave portion 112 of lower die 110 by setting exposed portion 10c to face upward.

Figure 2:
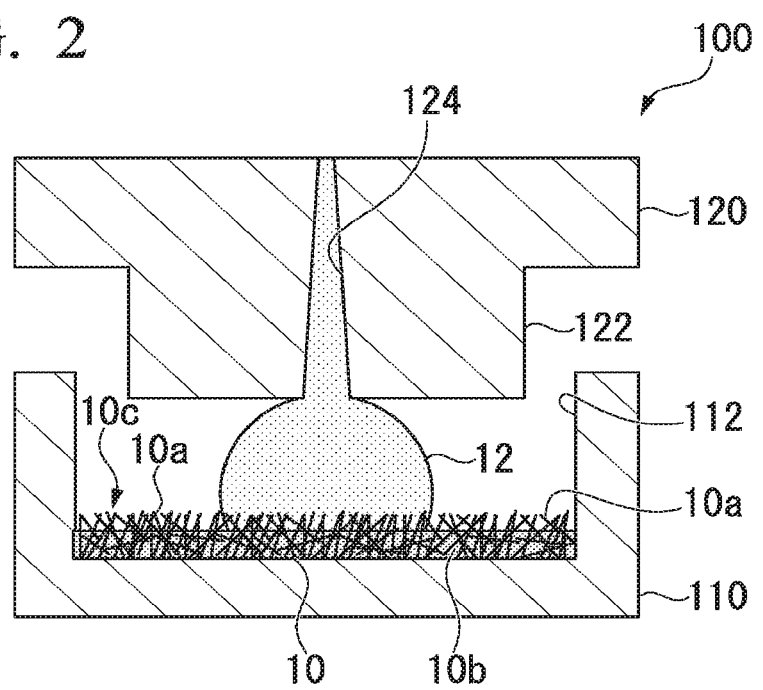
FIG. 2 is a cross-sectional view showing a step in the method for manufacturing a molded article of fiber-reinforced composite material related to the present invention.

Next, using an infrared heater or the like, fiber-reinforced resin substrate (X) 10 is heated to at least the softening temperature of thermoplastic resin (x1) 10*b*. Then, as shown in FIG. 2, resin composition (Y) 12 containing thermoplastic resin (y1) and reinforcing fibers (y2) is injected on fiber-reinforced resin substrate (X) 10 through resin channel 124 of upper die 120.

Figure 3:
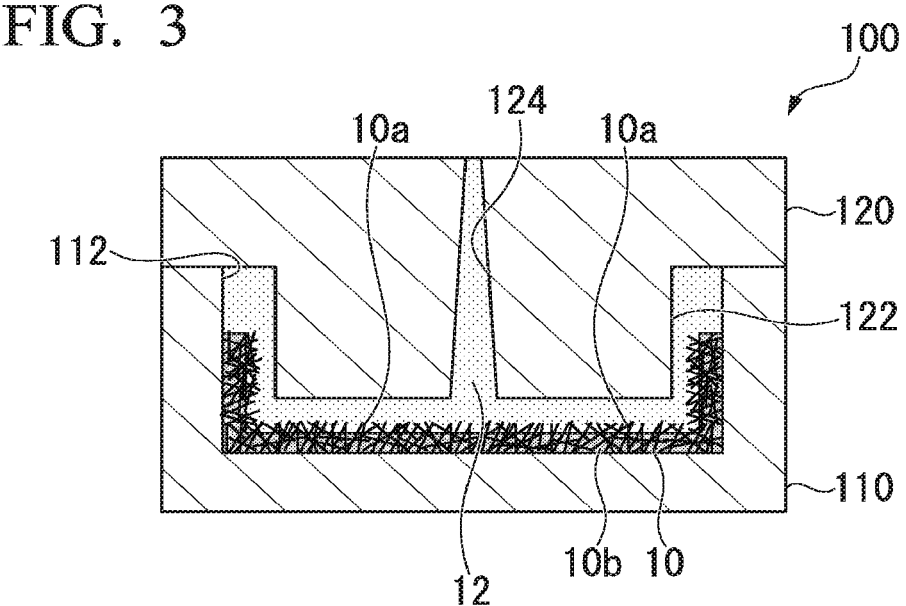
FIG. 3 is a cross-sectional view showing a step in the method for manufacturing a molded article of fiber-reinforced composite material related to the present invention.

After that, as shown in FIG. 3, upper die 120 is set to be adjacent to lower die 110 to close die 100, and resin composition (Y) 12 is impregnated into, and integrated with, exposed portion 10*c* while fiber-reinforced resin substrate (X) 10 is being shaped. After thermoplastic resin (x1) and thermoplastic resin (y1) are solidified, die 100 is opened and molded article 1 of fiber-reinforced composite material is taken out of the die.

In molded article 1 of fiber-reinforced composite material obtained in the above example, insert-molded portion 2 containing fiber-reinforced resin substrate (X) 10 and integrally molded portion 3 made of resin composition (Y) 12 are integrated as shown in FIG. 4. Moreover, in molded article 1 of fiber-reinforced composite material, insert-molded portion 2 and integrally molded portion 3 form plate portion 4 and side portions (5, 5) which are set upright on both ends of plate portion 4. In a thickness direction of molded article 1 of fiber-reinforced composite material, first layer 23, second layer 22, and third layer 21 are formed in that order from insert-molded portion 2 toward integrally molded portion 3.

As described so far, in a method for manufacturing a molded article of fiber-reinforced composite material related to the present invention, thermoplastic resin (y1) and reinforcing fibers (y2) are impregnated into the exposed portion of reinforcing fibers (x2) in fiber-reinforced resin substrate (X) placed on the die so as to be integrated with fiber-reinforced resin substrate (X). Accordingly, as shown in FIG. 5, in the second layer located at the border between the insert-molded portion and the integrally molded portion, reinforcing fibers (y2) are present in such a way that the fibers penetrate among reinforcing fibers (x2), thereby enhancing adhesive strength at the border between the insert-molded portion and the integrally molded portion.

Especially, when fiber-reinforced resin substrate (X1) compressible in a thickness direction is used, since there is more space in the substrate, reinforcing fibers (y2) with a fiber length of 0.02~3.0 mm tend to enter the exposed portion of reinforcing fibers (x2) during the molding process. Accordingly, such a setting is more likely to be effective for enhancing the adhesive strength at the border between the insert-molded portion and the integrally molded portion.

The method for manufacturing a molded article of fiber-reinforced composite material related to the present invention is not limited to the above. For example, it is an option to manufacture a molded article of fiber-reinforced composite material using a die having a lower die with a convex portion protruding upward and an upper die with a concave portion formed on the lower-surface side.

In a method for manufacturing a molded article of fiber-reinforced composite material related to the present invention, fiber-reinforced resin substrate (X) shaped in advance may be set in a die, on which resin composition (Y) is injection-molded or press-molded.

The shape of a molded article of fiber-reinforced composite material to be manufactured by the method related to the present invention is not limited particularly. For example, ribs or bosses may be formed at the integrally molded portion.

In the following, the present invention is described in further detail, but the present invention is not limited to the following examples.

MANUFACTURING EXAMPLE A1

Using a rotary cutter, chopped carbon fibers to be used as reinforcing fibers (x2) were prepared by cutting a carbon fiber (Pyrofil TR 50S, specific gravity: 1.82, made by Mitsubishi Rayon Co., Ltd.) into a fiber length of 12 mm. Also, fibers made of acid-modified polypropylene resin (Modic P958V, MFR 50, specific gravity: 0.91, made by Mitsubishi Chemical Corporation) as thermoplastic resin (x1) were cut into a fiber length of 3 mm, and chopped polypropylene fibers were prepared. Into 115 kg of a polyethylene oxide solution with a mass concentration of 0.12%, 0.63 kg of chopped polypropylene fibers were added and well stirred. Then, 0.54 kg of chopped carbon fibers were added and stirred for 10 seconds to obtain a dispersion. The dispersion was poured into a 100 cm-square mesh frame to filter the polyethylene oxide solution, and was dried in a 120° C. dryer to completely eliminate moisture. Accordingly, a fiber-reinforced resin substrate (X-1) was obtained to have a fiber volume ratio of 30 vol. % (fiber mass content: 46 mass %) and a basis weight of 1.17 kg/m$^2$. The ratio of the total volume of reinforcing fibers (x2) relative to the entire volume of reinforcing fibers in fiber-reinforced resin substrate (X-1) is 100 vol. %. When calculated from the specific gravity and basis weight of fiber-reinforced resin substrate (X-1), the theoretically determined thickness is 1.0 mm.

MANUFACTURING EXAMPLE A2

Fiber-reinforced resin substrate (X-1) obtained in Manufacturing Example A1 was cut into a 30 cm square, which was placed into a 15 mm-deep 300 mm-square core/cavity, and heated to 200° C. Then, using a multi-stage pressing machine (compression-molding machine, SFA-50HHO, made by Shinto Metal Industries Corporation), heat and pressure were exerted on the substrate by setting the board surface temperature at 200° C., pressure at 0.2 MPa, and time for 2 minutes. Then, the substrate was cooled to room temperature while it was still under the same pressure. Accordingly, a 1 mm-thick fiber-reinforced plastic plate (i) was obtained. Reinforced fibers (x2) were not exposed on the surface of fiber-reinforced plastic plate (i).

EXAMPLE 1

Figure 6:
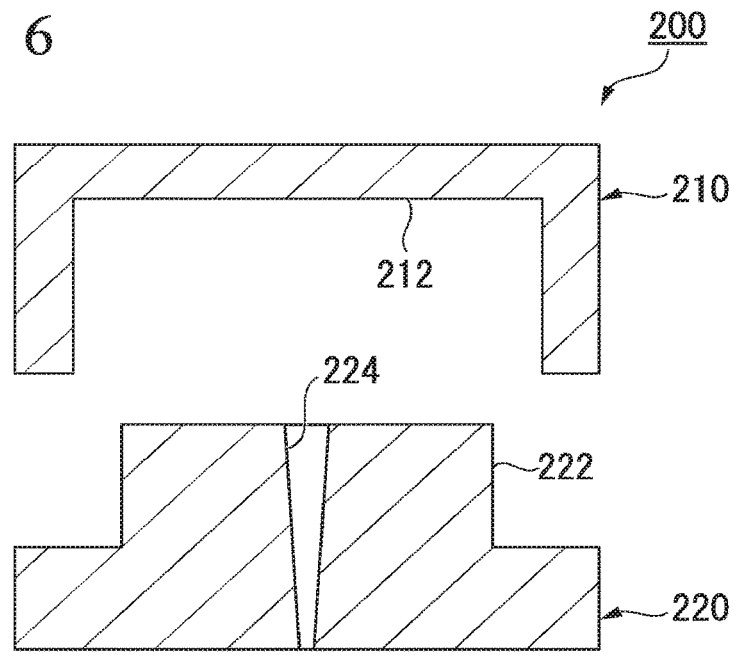
FIG. 6 is a cross-sectional view showing a die used in the examples.

Using die 200 shown in FIG. 6, a mobile IR heater, and an injection-molding apparatus ET-80 HR2 made by Toyo Machinery & Metal Co., Ltd., a molded article of fiber-reinforced composite material was manufactured. Die 200 has upper die 210 with concave portion 212 formed on the lower-surface side, and lower die 220 with convex portion 222 protruding upward. In lower die 220, resin channel 224 is formed for injection of resin from the upper surface of convex portion 222. When die 200 is closed by setting upper die 210 to be adjacent to lower die 220, a cavity (cavity thickness of 2 mm) in a shape complementary to that of the target molded article of fiber-reinforced composite material is formed between concave portion 212 and convex portion 222 in die 200.

Fiber-reinforced resin substrate (X-1) obtained in Manufacturing Example (A1) was placed on convex portion 222 of lower die 220, which was heated by a mobile IR heater for 15 seconds until the surface temperature of fiber-reinforced resin substrate (X-1) reached at least 185° C. so as to melt the polypropylene fibers on the upper portion of fiber-reinforced resin substrate (X-1). Die 200 was closed, and resin composition (Y-1) heated to 210° C. and melted was injected through resin channel 224 of lower die 220 into the cavity of die 200. While the polypropylene fibers on the lower side of fiber-reinforced resin substrate (X-1) were melted, the resin composition (Y-1) was impregnated into the exposed portion of reinforcing fibers (x2) so as to be integrated with fiber-reinforced resin substrate (X-1). Accordingly, 2 mm-thick molded article (F-1) of fiber-reinforced composite material was obtained. As for resin composition (Y-1), carbon-fiber reinforced polypropylene resin pellets containing carbon fibers (average fiber length: 0.6 mm) as reinforcing fibers (y2) (product name "Pyrofil Pellet PP-C-20A" made by Mitsubishi Rayon, fiber volume ratio: 11 vol. % (fiber mass content: 20 mass %), softening temperature: 165° C.) was used. The ratio of the total volume of reinforcing fibers (y2) relative to the entire volume of reinforcing fibers in resin composition (Y-1) is 100 vol. %.

COMPARATIVE EXAMPLE A1

A 2 mm-thick molded article (F-2) of fiber-reinforced composite material was obtained by employing the same procedure as in Example (A1) except that resin composition (Y-1) was replaced with polypropylene resin that does not contain reinforcing fibers (y2) (product name "Novatec SA06GA", made by Japan Polypropylene Corporation, softening temperature: 165° C.).

COMPARATIVE EXAMPLE A2

A 2 mm-thick molded article (F-3) of fiber-reinforced composite material was obtained by employing the same procedure as in Example (A1) except that fiber-reinforced resin substrate (X-1) was replaced with a fiber-reinforced plastic plate (i) obtained in manufacturing Example A2, and a heating process by a mobile IR heater was omitted.

[Evaluation of Structure by X-Ray CT Scanner: Method for Measuring Abundance Ratio of Reinforced Fibers in Molded Article of Fiber-reinforced Composite Material, and Method for Measuring Volume Content of Reinforcing Fiber in Specific Layer]

A 10 mm×10 mm test piece was cut out from the molded article of fiber-reinforced composite material prepared in each example. When the thickness of the molded article of fiber-reinforced composite material exceeds 10 mm, either or both of the upper layer portions in a thickness direction are carved so as to make a thickness of 10 mm or less, but the border portion between portions made of fiber-reinforced resin substrate (X) and resin composition (Y) remains intact.

Using an X-ray CT scanner with a focus size of 1 μm, a test piece was placed in such a way that its thickness direction was aligned to the Z-axis and its X-Y plane was fixed, and a test piece was moved along the Z-axis (measured in a region of the unit area on the X-Y plane: 10 mm×10 mm). The pixel pitch during the measurement was set at 1 μm or less in consideration of measurement accuracy. The scanned image was converted into a three-dimensional display using analysis software. The image was processed so that only the reinforcing fibers were displayed, and the reinforcing fibers were color-coded by fiber length. In the examples, reinforcing fibers with a fiber length of 100 mm or longer were coded in yellow, reinforcing fibers with a fiber length of 3 mm or longer but shorter than 100 mm were coded in red, and reinforcing fibers with a fiber length of 0.02 mm or longer but shorter than 3 mm were coded in blue. Reinforcing fibers with a fiber length shorter than 0.02 mm were ignored.

Each of the color-coded reinforcing fibers was segmented every 40 μm measured from both fiber end portions. More specifically, if it was a 176 μm long-reinforcing fiber, for example, its fiber length was cut into segments of 40 μm, 40 μm, 16 μm, 40 μm and 40 μm, measured from either end. During that time, for a segment where the fiber length was less than 40 μm, the section was made sure to be positioned in the center of the reinforcing fiber prior to segmentation. In addition, when the number of segments was an odd number, the difference in the numbers of 40 μm-long segments was one when counting those on each side of a segment with a length shorter than 40 μm. For example, if it was a 65 μm-long reinforcing fiber, its fiber length was cut into segments of 40 μm and 25 μm measured from either end. Moreover, if it was a 130 μm long-reinforcing fiber, its fiber length was cut into segments of 40 μm, 40 μm, 10 μm and 40 μm measured from either end. When the fiber length was 20 μm or longer but shorter than 40 μm, the fiber was not segmented, and when the fiber length after segmentation was shorter than 20 μm, the portion was deleted.

Next, the segmented reinforcing fiber with a fiber length of 20 μm to 40 μm was converted to a dot display at the center of the fiber in a length direction. The dot was color-coded using the same color as that of the reinforcing fiber. The measuring range of a test piece (a space of 10 mm×10 mm×"H" mm thick) was segmented every 25 μm in a thickness direction from the side where fiber-reinforced resin substrate (X) was present. In other words, if it was a test piece with a thickness of "H" mm, the measuring range was marked into H×1000÷25 segments in a thickness direction. In the space of each segment, the abundance ratios of dots color-coded in yellow, red or blue were counted. The abundance ratios of the dots in each space correspond respectively to abundance ratios in the volume of reinforcing fibers with a fiber length of 100 mm or longer (yellow), reinforcing fibers (x2) with a fiber length of 3 mm or longer but shorter than 100 mm (blue), and reinforcing fibers (y2) with a fiber length of 0.02 mm or longer but shorter than 3 mm (red). Next, in a test piece, spaces having reinforcing fibers (x2) (blue) at 67 vol. % or more were sorted together as the first layer, spaces having reinforcing fibers (x2) (blue) at more than 33 vol. % and reinforcing fibers (y2) (red) at less than 67 vol. % were sorted together as the second layer, and spaces having reinforcing fibers (y2) (red) at 67 vol. % or more were sorted together as the third layer. When a test piece did not have spaces in the order of first, second and third layers, such sorting was skipped.

Next, fiber volume ratios (Vf1)~(Vf3) of first to third layers respectively were obtained using the formula below.

$$Vf=40\ \mu m \times (\text{fiber radius}) \times (\text{fiber radius}) \times (\text{circular constant}) \times (\text{number of dots in a unit space}) \div (\text{volume of unit space}) \times 100$$

Next, when a test piece had first to third layers that satisfy the conditions specified in the present invention, it was evaluated as "∘(excellent)" and when a piece did not have those layers, it was evaluated as "×(poor)."

[Measuring Interlaminar Shear Strength]

A text piece 25.4 mm long×6.3 mm wide×2 mm thick was cut out from the molded article of fiber-reinforced composite material, and its interlaminar shear strength (ILSS) was determined based on ASTM D2344.

The results of Example (A1) and Comparative Examples (A1, A2) are shown in Table 1.

TABLE 1

| | Evaluation of Structure by X-ray CT Scanning | Interlaminar Shear Strength [MPa] |
|---|---|---|
| Example A1 | ○ | 22 |
| Comp. Example A1 | x | 11 |
| Comp. Example A2 | x | 15 |

As shown in Table 1, the molded article of fiber-reinforced composite material obtained in Example (A1) having first to third layers that satisfy the conditions specified in the present invention exhibited greater interlaminar shear strength than the molded articles of fiber-reinforced composite material obtained in Comparative Examples (A1, A2) having no such layers.

MANUFACTURING EXAMPLE B1

Using carbon fibers with a fiber length of 50 mm and a carding method, a carbon-fiber non-woven fabric is manufactured, containing carbon fibers with an average fiber length of 25 mm as reinforcing fibers (x2) and having a basis weight of 300 g/m$^2$.

As thermoplastic resin (x1), film made of acid-modified polypropylene resin (product name "Modic P958V, made by Mitsubishi Chemical, softening temperature: 165° C.) with a basis weight of 200 g/m$^2$ is placed on one surface of a carbon-fiber non-woven fabric, which is then passed through calender rolls multiple times so as to be heated and pressured, while the resin is impregnated into the carbon-fiber non-woven fabric. Accordingly, 470 μm-thick fiber-reinforced resin substrate (X1-1) is obtained. In fiber-reinforced resin substrate (X1-1), one side is impregnated with thermoplastic resin (x1), but its opposite side in a thickness direction is left unimpregnated and reinforcing fibers (x2) are exposed. In fiber-reinforced resin substrate (X1-1), the portion impregnated with thermoplastic resin (x1) is 330 μm thick, and the unimpregnated portion is 140 μm thick. The fiber-reinforced resin substrate (X1-1) is a compressible substrate with a compression rate ($P_A$) of 50% and a compression rate ($P_B$) of 57%. The ratio of the total volume of reinforcing fibers (y2) to the entire volume of reinforcing fibers in fiber-reinforced resin substrate (X1-1) is 100 vol. %.

EXAMPLE B1

Using die 100 shown in FIG. 1, a molded article of fiber-reinforced composite material is manufactured.

In concave portion 112 of lower die 110, fiber-reinforced resin substrate (X1-1) obtained in Manufacturing Example (B 1) is arranged by setting the unimpregnated portion to face upward. Next, fiber-reinforced resin substrate (X1-1) is heated to 210° C. using an IR heater, and die 100 is closed so as to shape fiber-reinforced resin substrate (X1-1).

Carbon-fiber reinforced polypropylene resin pellets (product name "Pyrofil Pellet PP-C-10A" made by Mitsubishi Rayon, carbon fiber content: 10 mass %, softening temperature: 165° C., average fiber length: 0.6 mm) is used as resin composition (Y-2). The ratio of the total volume of reinforcing fibers (y2) relative to the entire volume of reinforcing fibers in resin composition (Y-2) is 100 vol. %. Resin composition (Y-2) is heated to 210° C. to melt it, which is then injected through resin channel 124 of upper die 120 into the space in die 100. The resin composition is impregnated into the exposed portion of reinforcing fibers (x2) in fiber-reinforced resin substrate (X-1) and is integrally molded with fiber-reinforced resin substrate (X-1). Accordingly, 2 mm-thick molded article (F-4) of fiber-reinforced composite material is obtained. In molded article (F-4) of fiber-reinforced composite material, fiber length of carbon fibers as reinforcing fibers (y2) is 0.2~0.75 mm and average fiber length is 0.5 mm.

EXAMPLE B2

Using die 100 shown in FIG. 1, a molded article of fiber-reinforced composite material is manufactured.

As thermoplastic resin (y1), 85 parts by mass of polypropylene resin (product name "Novatec SA06GA" made by Japan Polypropylene Corporation, softening temperature: 165° C.) and 15 parts by mass of 25 mm-long carbon fibers (product name "Pyrofil Carbon Fiber Tow TR 50S" made by Mitsubishi Rayon) are kneaded using a twin-screw extruder to obtain resin composition (Y-3). In resin composition (Y-3), the average fiber length of carbon fibers as reinforcing fibers (y2) is 0.75 mm. The ratio of the total volume of reinforcing fibers (y2) to the entire volume of reinforcing fibers in the resin composition (Y-3) is 100 vol. %.

In concave portion 112 of lower die 110, fiber-reinforced resin substrate (X1-1) obtained in Manufacturing Example (B1) is arranged by setting the exposed portion of reinforcing fibers (x2) to face upward. Next, using an infrared heater, fiber-reinforced resin substrate (X1-1) is heated to 210° C. and die 100 is kept ajar. Then, resin composition (Y-3) heated at 210° C. to be melted is injected on the fiber-reinforced resin substrate (X1-1) through resin channel 124 of upper die 120.

Then, die 100 is closed. While fiber-reinforced resin substrate (X1-1) is shaped, resin composition (Y-3) is impregnated into the exposed portion of reinforcing fibers (x2) in fiber-reinforced resin substrate (X1-1) so as to be integrally molded with fiber-reinforced resin substrate (X1-1). Accordingly, a 2 mm-thick molded article (F-5) of fiber-reinforced composite material is obtained. In molded article (F-5) of fiber-reinforced composite material, the fiber length of carbon fibers as reinforcing fibers (y2) is 0.1~1.3 mm and the average fiber length is 0.6 mm.

EXAMPLE B3

Using die 100 shown in FIG. 1, a molded article of fiber-reinforced composite material is manufactured.

As thermoplastic resin (y1), 75 parts by mass of polypropylene resin (product name "Novatec SA06GA" made by Japan Polypropylene Corporation, softening temperature: 165° C.) and 25 parts by mass of 25 mm-long carbon fibers (product name "Pyrofil Carbon Fiber Tow TR 50S" made by Mitsubishi Rayon) are kneaded using a twin-screw extruder to obtain resin composition (Y-4). In resin composition (Y-4), the average fiber length of carbon fibers as reinforcing fibers (y2) is 0.75 mm. The ratio of the total volume of reinforcing fibers (y2) to the entire volume of reinforcing fibers in resin composition (Y-4) is 100 vol. %.

In concave portion 112 of lower die 110, fiber-reinforced resin substrate (X1-1) obtained in Manufacturing Example (B1) is arranged by setting the unimpregnated portion to face upward. Next, using an infrared heater, fiber-reinforced resin substrate (X1-1) is heated to 210° C. and die 100 is closed so as to shape fiber-reinforced resin substrate (X1-1).

Next, die 100 is slightly opened, into which resin composition (Y-4) heated to 210° C. to be melted is injected on fiber-reinforced resin substrate (X1-1) through resin channel 124 of upper die 120.

Then, die 100 is closed to shape fiber-reinforced resin substrate (X1-1), while resin composition (Y-4) is impregnated into the exposed portion of reinforcing fibers (x2) in fiber-reinforced resin substrate (X1-1) so as to be integrally molded with fiber-reinforced fiber substrate (X1-1). Accordingly, 2 mm-thick molded article (F-6) of fiber-reinforced composite material is obtained. In molded article (F-6), the fiber length of carbon fibers as reinforcing fibers (y2) is 0.07~1.3 mm and the average fiber length is 0.6 mm.

COMPARATIVE EXAMPLE B1

By employing the same procedure as in Example B1, 2 mm-thick molded article (F-7) of fiber-reinforced composite material is obtained except that resin composition (Y-2) is replaced with polypropylene resin that does not contain reinforcing fibers (y2) (product name "Novatec SA06GA" made by Japan Polypropylene Corporation, softening temperature 165° C.).

[Average Fiber Length of Reinforcing Fibers (y2) in Molded Article of Fiber-Reinforced Composite Material]

The average fiber length of reinforcing fibers (y2) in a molded article of fiber-reinforced composite material is measured as follows. A molded article of fiber-reinforced composite material is put into an oven and sintered at 500° C. for 2 hours so as to burn the resin. The ashes are homogeneously dispersed in water. The dispersion is put in a dish, dried and observed using an optical microscope. The fiber length of reinforcing fibers (y2) is measured by picking 1000 fibers at random. The mass average is calculated by the formula below, which is set as the average fiber length of reinforcing fibers (y2).

Average fiber length=$\Sigma(Mi^2 \times Ni)/\Sigma(Mi \times Ni)$

In the above formula, "Mi" is the measured fiber length (mm), and "Ni" is the number of reinforcing fibers (y2) having fiber length "Mi" (mm).

[Evaluation of Adhesive Strength]

The adhesive strength at the border between the insert-molded portion and the integrally molded portion in a molded article in each Example is evaluated as follows.

A 12.7 mm wide×120 mm long test piece is cut out from a molded article of fiber-reinforced composite material and a bending test is conducted in accordance with JIS K7074. At the first yield point in the stress-strain curve obtained by the test, if substrate fracture is observed, it is evaluated as "○", whereas if peeling occurs at the border of the insert-molded portion and the integrally molded portion, it is evaluated as "×". Evaluation results are shown in Table 2.

TABLE 2

|  | Evaluation of Adhesive Strength |
|---|---|
| Example B1 | ○ |
| Example B2 | ○ |
| Example B3 | ○ |
| Comp. Example B1 | × |

As shown in Table 2, molded articles of fiber-reinforced composite material in Examples (B1~B3) manufactured by the method related to the present invention exhibit higher adhesive strength at the border of the insert-molded portion and the integrally molded portion compared with the molded article of fiber-reinforced composite material in Comparative Example (B1) that does not contain reinforcing fibers (y2) in the thermoplastic resin composition. That is because in molded articles of fiber-reinforced composite material obtained in Examples (B1~B3), reinforcing fibers (y2) are present in such a way that the fibers penetrate the unimpregnated portion of fiber-reinforced resin substrate (X) in the insert-molded portion.

DESCRIPTION OF NUMERICAL REFERENCES

1 molded article of fiber-reinforced composite material
2 insert-molded portion
3 integrally molded portion
4 plate portion
5 side portion
6 border
10 fiber-reinforced resin substrate (X)
10*a* reinforcing fibers (x2)
10*b* thermoplastic resin (x1)
10*c* exposed portion
12 resin composition (Y)
12*a* thermoplastic resin (y1)
12*b* reinforcing fibers (y2)
21 third layer
22 second layer
23 first layer
100 die
110 lower die
112 concave portion
120 upper die
122 convex portion
124 resin channel

What is claimed is:

1. A molded article of fiber-reinforced composite material, comprising:
    reinforcing fibers;
    a thermoplastic resin; and
    a first layer, second layer and third layer formed in that order, wherein:
    the first layer has a thickness of at least 300 μm, a ratio of a total volume of reinforcing fibers (x2) with a fiber length of 3 mm or longer but shorter than 100 mm relative to an entire volume of reinforcing fibers in the first layer is set at 67 vol. % or higher, and a fiber volume ratio (Vf1) is from 15 to 50 vol. %;
    the second layer has a thickness of from 100 to 1500 μm, and relative to an entire volume of reinforcing fibers in the second layer, a ratio of the total volume of the reinforcing fibers (x2) is more than 33 vol. % while a ratio of a total volume of reinforcing fibers (y2) with a fiber length of 0.02 mm or longer but shorter than 3 mm is set at 36 vol. % or more and lower than 67 vol. %; and
    the third layer has a thickness of at least 300 μm, a ratio of the total volume of the reinforcing fibers (y2) relative to an entire volume of reinforcing fibers in the third layer is set at 67 vol. % or higher, and a fiber volume ratio (Vf3) is from 5 to 25 vol.%,
    wherein reinforcing fibers (x2) and reinforcing fibers (y2) are each inorganic fibers.

2. The molded article according to claim 1, wherein the first layer and the third layer are bonded with the second layer placed between them.

3. The molded article according to claim 1, wherein the fiber volume ratio (Vf1) in the first layer, the fiber volume ratio (Vf2) in the second layer and the fiber volume ratio (Vf3) in the third layer satisfy formula (1):

$$Vf3 < Vf2 < Vf1 \ldots \tag{1}$$

4. The molded article according to claim 1, wherein reinforcing fibers (x2) are carbon fibers.

5. The molded article according to claim 1, wherein reinforcing fibers (y2) are carbon fibers.

6. The molded article according to claim 1, wherein reinforcing fibers (x2) and reinforcing fibers (y2) are each carbon fibers.

7. A method of producing the molded article of fiber-reinforced composite material as claimed in claim 1, the method comprising:

integrally molding in a die a fiber-reinforced resin substrate (X) comprising a thermoplastic resin (x1) and reinforcing fibers (x2) with a fiber length of 3 mm or longer but shorter than 100 mm and a resin composition (Y) comprising a thermoplastic resin (y1) and reinforcing fibers (y2) with a fiber length of 0.02 mm or longer but shorter than 3 mm, wherein:

relative to an entire volume of reinforcing fibers in the fiber-reinforced resin substrate (X), a ratio of a total volume of the reinforcing fibers (x2) is 67 vol. % or higher, and a fiber volume ratio in the fiber-reinforced resin substrate (X) is from 15 to 50 vol. %;

relative to an entire volume of reinforcing fibers in the resin composition (Y), a ratio of a total volume of the reinforcing fibers (y2) is 67 vol. % or higher, and a fiber volume ratio in the resin composition (Y) is from 5 to 25 vol. %; and the integrally molding of the fiber-reinforced resin substrate (X) and the resin composition (Y) occurs in a state where the reinforcing fibers (x2) are exposed on at least a portion of a surface of fiber-reinforced resin substrate (X).

8. The method according to claim 7, further comprising, prior to the integrally molding:

exposing the reinforcing fibers (x2) on at least a portion of the surface of fiber-reinforced resin substrate (X) by applying heat on a portion of the fiber-reinforced resin substrate (X) where no reinforcing fibers (x2) are exposed.

9. The method according to claim 7, wherein the resin composition (Y) is injected into the die during the integrally molding.

10. The method according to claim 9, wherein the resin composition (Y) is injected when the fiber-reinforced resin substrate (X) is placed and is being shaped in the die, or after the fiber-reinforced resin substrate (X) is placed and shaped in the die.

11. The method according to claim 7, wherein the fiber-reinforced resin substrate (X) and the resin composition (Y) are press-molded to be integrated with each other during the integrally molding.

12. The method according to claim 7, wherein at least part of the thermoplastic resin (x1) is fibrous.

13. The method according to claim 7, wherein the fiber-reinforced resin substrate (X) is a fiber-reinforced resin substrate (X1) which is compressible in a thickness direction.

* * * * *